C. G. OLSON.
FILING MACHINE.
APPLICATION FILED JAN. 13, 1916.

1,194,414.

Patented Aug. 15, 1916.
2 SHEETS—SHEET 1.

Inventor:
Carl G. Olson.
By Cheever & Cox
Attys

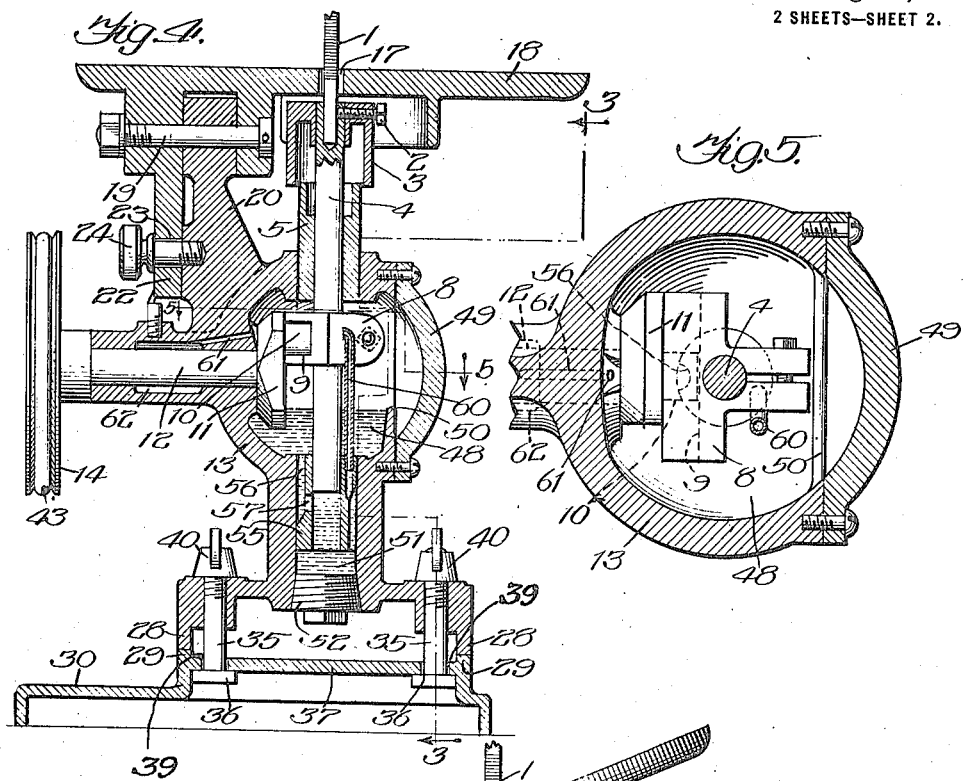

UNITED STATES PATENT OFFICE.

CARL G. OLSON, OF CHICAGO, ILLINOIS, ASSIGNOR TO ILLINOIS TOOL WORKS, OF CHICAGO, ILLINOIS, A CORPORATION OF ILLINOIS.

FILING-MACHINE.

1,194,414.      Specification of Letters Patent.    Patented Aug. 15, 1916.

Application filed January 13, 1916. Serial No. 71,821.

*To all whom it may concern:*

Be it known that I, CARL G. OLSON, a citizen of the United States, residing at Chicago, in the county of Cook and State of Illinois, have invented a certain new and useful Improvement in Filing-Machines, of which the following is a specification.

My invention relates to machine tools, more particularly of that type in which a tool holder or chuck reciprocates in proximity to a work-table.

The object of the invention is to provide for certain adjustments, especially in the main frame relatively to the base, and in the table relatively to the frame.

My invention contemplates a construction in which the table, chuck and main frame may be tilted in unison or may be angularly adjusted independently of each other. This enables the workman, without moving the machine as a whole, to bring the surface of the work-table to any desired angle of inclination, either with or without changing the lie of the work-table relatively to the direction of motion of the tool.

My invention contemplates, also, the obtaining of these adjustments without requiring any readjustment or disturbance in any manner, of the driving means by which power is imparted to the tool.

I accomplish my objects by the construction illustrated in the accompanying drawings, in which—

Figure 1:
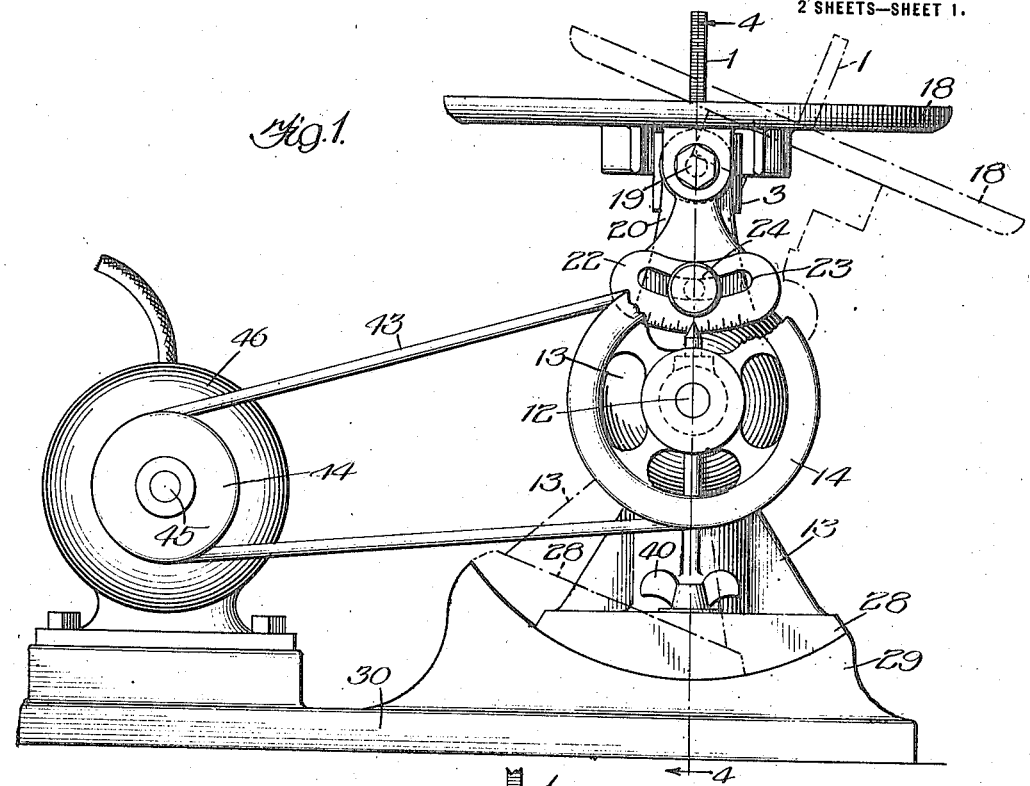
Figure 2:
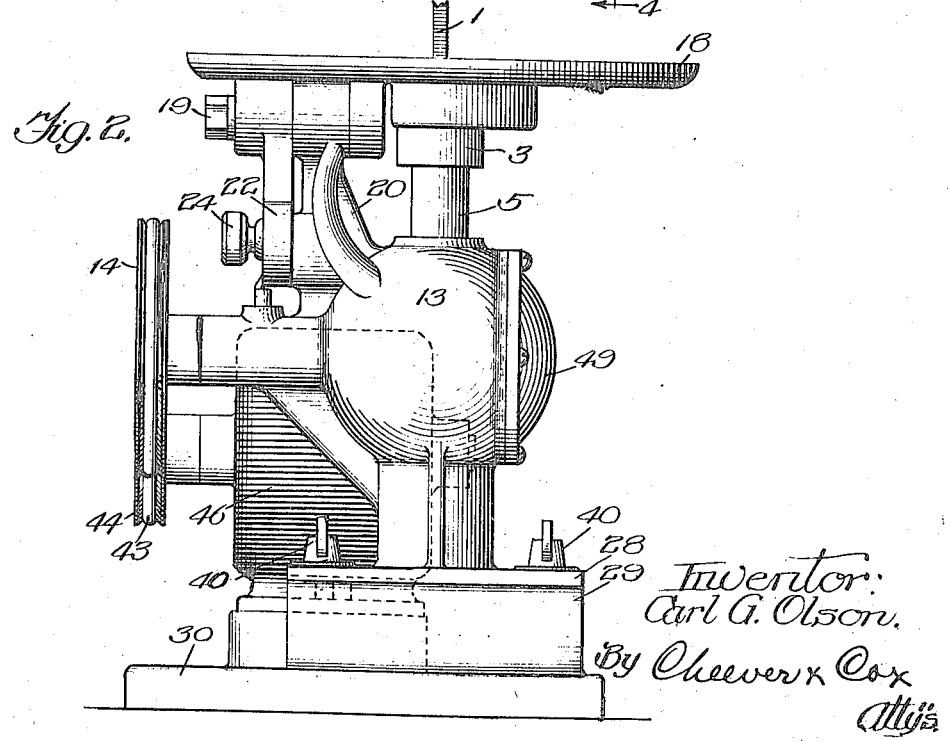

Figure 1 is a side elevation of a machine embodying my invention. Fig. 2 is an end elevation of the machine looking toward the left in Fig. 1. Fig. 3 is a sectional elevation on the line 3—3, Fig. 4. Fig. 4 is a sectional elevation on the line 4—4, Fig. 1, and Fig. 5 is a plan section on the line 5—5, Fig. 4.

Similar numerals refer to similar parts throughout the several views.

I have chosen to illustrate the invention as embodied in a so-called "die filing machine," the machine in this instance being driven by an electric motor mounted upon a base, which also supports the frame of the machine.

In the design selected to illustrate the invention, the file 1 is fastened by means of a set screw 2, or otherwise, to a chuck or tool holder, consisting, in the present case, of a cap 3 and rod 4. The cap and rod move as a single piece. The rod passes through a cylindrical guide 5, while the cap 3 is chambered at the bottom and passes over the upper end of said guide. The rod 4, together with the file 1 (or other tool carried by it), are reciprocated by means of a cross-head 8 which is clamped or otherwise securely fastened to the rod and is provided with a horizontal slot 9 which receives a pin 10 projecting into it from a disk 11, as best shown in Figs. 3, 4 and 5. Said disk is secured to the inner end of a drive shaft 12 which is journaled in the frame 13 of the machine and driven by a sheave or pulley 14. The parts are so arranged that when the pulley rotates it will cause the pin 10 to rotate and produce a reciprocatory movement of the cross-head 8 and rod 4. The cross-head, disk and pin may, therefore, be regarded as eccentric mechanism for reciprocating the tool holder.

The tool 1 passes up through a suitable aperture 17 formed in the work-table 18. Said table is pivotally supported upon a pivot pin 19 supported in horizontal position by the bracket 20 which forms, preferably, an integral part of the frame 13. The table is provided with a depending arm 22 having a curved slot 23 centered upon the axis of the pin 19. A set screw 24 passes through this slot and screws into the bracket 20. When this screw is backed off, it permits the table to be tilted about the center of the pin 19 as an axis. By tightening said screw, the table will be securely held in the position to which it is adjusted. It will thus be seen that the table is angularly adjustable with reference to the frame upon which it is supported.

At the base of the frame 13 are formed two convex parallel flanges or ways 28, the lower edges whereof are circular in outline with a center of curvature coincident with the axis of the drive shaft 12. These flanges rest upon similarly curved concave flanges 29 forming a part of the base 30 of the machine.

The flanges 28 make sliding contact with the flanges 29 with the result that the main frame or standard of the machine is tiltable upon the base about an axis concentric with the axis of the main shaft 12 and pulley 14. By preference, the flanges 29 are considerably longer than flanges 28 so that the frame may be tilted through a considerable angle without having the ends of the flanges 28 project much, if any, beyond the ends of the flanges 29. The machine frame is secured at the desired angle by anchor bolts 35 having heads 36 which engage the bottom of the curved platform 37 of the base 30 of the machine. These bolts pass up through slots 39 formed in said platform as best shown in Figs. 3 and 4. The bolts also pass up through the foot of the frame 13 where they are provided with wing nuts 40. Platform 37 is cylindrical and concentric with the axis of the main shaft 12, and the slots 39 extend in a plane transverse to the axis of said shaft. Consequently, the bolts, when loosened, are free to slide in the slots 39 and permit the machine frame to be tilted to the desired angle of inclination. By tightening up the nuts, the frame will be securely held in the position to which it is adjusted.

From the foregoing it will be evident that the main frame 13 is adjustable relatively to the main supporting base of the machine and that the work-table is adjustable relatively to the frame and that the table is adjustable independently of the position of the frame. It is also evident that the main frame is adjustable about the center of the shaft 12 and pulley 14 as an axis. Said pulley 14, is driven by a rope or belt 43, driven by a pulley 44 secured to a shaft 45 mounted upon the base 30. Said pulley 44 may be driven in a variety of ways, but in the present instance it is shown to be driven by an electric motor 46, the shaft 45 being the shaft of the motor. Inasmuch as the frame 13, when adjusted, tilts about the center of the shaft 12 as an axis, and as the pulley 14 is concentric with said shaft, it follows that the frame may be tilted to any desired angle without disturbing the tension of the drive belt 43. In other words, the main frame of the machine may be adjusted to any desired angle without requiring any corresponding adjustment of the driving belt. When it is desired to bring the machine to a different angle all that is necessary is to loosen the wing nuts 40, slide the foot of the frame to the desired position upon the curved flanges 29 of the base and then tighten the wing nuts to hold the parts in the new position. No attention need be paid to the drive belt for the tension thereof will not be changed by the change in position of the frame.

While any suitable lubricating system may be employed, I will now describe the system employed in this particular design of machine: I have so configurated the frame 13 as to form an oil reservoir 48 about on a level with the shaft 12. This reservoir is open at the side and is closed by a cover 49. In the preferred construction a lip 50 is formed just inside of the cover and this forms a dam for retaining the oil within the reservoir when the cover is removed. The frame is centrally bored to form a well 51 closed at the bottom by a screw plug 52 as best shown in Fig. 4. A pump cylinder 55 is fitted into the well 51 and is centrally bored to receive the lower end of the rod 4. Said rod consequently performs the dual function of a tool holder or chuck and plunger for forcing oil downward in this cylinder 55. Oil is constantly supplied to the lower end of cylinder 55 through a duct 56 terminating at the lower end in a port 57. Said port is so placed that when the rod rises it will uncover the port and when the rod descends it will close the port, and thereafter force oil out of the bottom of cylinder 55. The oil thus forced out of the bottom of cylinder 55 is led up through a duct 60 to keep the cross head 8 constantly lubricated. The eccentric disk 11 is notched in its periphery and dips down into the oil in the reservoir 48 with the result that when the shaft is rotated said disk acts as a splasher to supply oil to the duct 61 shown at the left of Fig. 4. This duct leads to a chamber 62 formed in the machine frame surrounding shaft 12 and serves to keep said shaft lubricated. It will thus be evident that when the machine is in operation the rod 4 will constantly force a stream of oil up through the duct 60 and the disk 11 will elevate the oil to the passages 61 and 62; consequently the oiling is automatic and there will be a constant circulation through the main bearings of the machine.

While I have described my machine as a filing machine, it will be understood that the term is used generically and that tools other than files may be introduced into the chuck or tool holder.

Having thus described my invention what I claim as new and desire to secure by Letters Patent, is:

1. In a machine tool, a base, a frame mounted on said base, a tool holder reciprocating in said frame, a power device on said base for actuating said tool holder, and a work table mounted on said frame, the work table, frame and tool holder being adjustable as a unit on said base for the convenience of the workman without changing the angle of the tool relatively to the work, said power device being connected to and operative upon said tool holder for all positions of said tool holder and work table.

2. A machine tool having a frame, a tool holder reciprocating in a straight line in said frame, a work table mounted on said frame, and a base on which the frame is mounted, the table, frame and tool holder being tiltable as a unit upon the base for the convenience of the operator without changing the angle of cut, and the table being tiltable relatively to its supporting frame for all positions of said frame, whereby the operator may obtain various angles of cut regardless of the position of the supporting frame and tool holder relatively to the base.

3. A filing machine having a base, a frame angularly adjustable upon said base about a fixed axis, a tool holder reciprocating in said frame, a work table mounted on said frame and being angularly adjustable upon said frame about an axis parallel to the axis of adjustment of the frame relatively to the base, a wheel mounted on said frame concentric with the axis of adjustment thereof for actuating the tool holder, and means mounted upon said base for driving said wheel in all positions of the frame, whereby the filing cut may be taken in the work at any desired angle, and the work table and file may be adjusted as a unit to accommodate the convenience of the workman.

In witness whereof, I have hereunto subscribed my name.

CARL G. OLSON.